United States Patent
Wang et al.

(10) Patent No.: US 10,643,063 B2
(45) Date of Patent: May 5, 2020

(54) FEATURE MATCHING WITH A SUBSPACE SPANNED BY MULTIPLE REPRESENTATIVE FEATURE VECTORS

(71) Applicant: QUALCOMM Incorporated, San Diego, CA (US)

(72) Inventors: Lei Wang, Clovis, CA (US); Yingyong Qi, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 15/948,676

(22) Filed: Apr. 9, 2018

(65) Prior Publication Data

US 2019/0311183 A1    Oct. 10, 2019

(51) Int. Cl.
| | |
|---|---|
| *G06K 9/64* | (2006.01) |
| *G06K 9/00* | (2006.01) |
| *G06K 9/62* | (2006.01) |
| *G06K 9/66* | (2006.01) |
| *G06T 7/174* | (2017.01) |
| *G06T 7/168* | (2017.01) |

(52) U.S. Cl.
CPC ..... *G06K 9/00288* (2013.01); *G06K 9/00255* (2013.01); *G06K 9/00281* (2013.01); *G06K 9/627* (2013.01); *G06K 9/6212* (2013.01); *G06K 9/6247* (2013.01); *G06K 9/6268* (2013.01); *G06K 9/66* (2013.01); *G06T 7/168* (2017.01); *G06T 7/174* (2017.01); *G06T 2207/20081* (2013.01); *G06T 2207/20084* (2013.01)

(58) Field of Classification Search
CPC . G06K 9/00221–00315; G06K 9/6212; G06K 9/6247; G06K 9/6268; G06K 9/627; G06K 9/66; G06T 7/168; G06T 7/174; G06T 2207/20081; G06T 2207/20084
See application file for complete search history.

(56) References Cited

U.S. PATENT DOCUMENTS

| | | | | |
|---|---|---|---|---|
| 6,690,814 | B1 * | 2/2004 | Yuasa | G06K 9/00228 382/118 |
| 8,116,575 | B1 * | 2/2012 | Saisan | A61B 5/1077 345/441 |
| 9,691,395 | B1 * | 6/2017 | Sieracki | G10L 17/06 |
| 10,509,952 | B2 * | 12/2019 | Kastaniotis | G06K 9/00295 |
| 2003/0161537 | A1 * | 8/2003 | Maeda | G06K 9/00221 382/218 |

(Continued)

*Primary Examiner* — Sean T Motsinger
(74) *Attorney, Agent, or Firm* — Holland & Hart LLP

(57) ABSTRACT

Methods, systems, and devices for object recognition are described. A device may generate a subspace based at least in part on a set of representative feature vectors for an object. The device may obtain an array of pixels representing an image. The device may determine a probe feature vector for the image by applying a convolutional operation to the array of pixels. The device may create a reconstructed feature vector in the subspace based at least in part on the set of representative feature vectors and the probe feature vector. The device may compare the reconstructed feature vector and the probe feature vector and recognize the object in the image based at least in part on the comparison. For example, the described techniques may support pose invariant facial recognition or other such object recognition applications.

20 Claims, 9 Drawing Sheets

(56) References Cited

U.S. PATENT DOCUMENTS

| | | | |
|---|---|---|---|
| 2003/0235332 A1* | 12/2003 | Moustafa | G06K 9/00241 |
| | | | 382/157 |
| 2008/0273761 A1* | 11/2008 | Kawata | G06K 9/00281 |
| | | | 382/115 |
| 2010/0067751 A1* | 3/2010 | Aoki | G06K 9/00288 |
| | | | 382/118 |
| 2011/0091115 A1* | 4/2011 | Kato | G06K 9/00248 |
| | | | 382/201 |
| 2016/0132720 A1* | 5/2016 | Klare | G06F 16/51 |
| | | | 382/118 |
| 2016/0269401 A1* | 9/2016 | Saito | G06K 9/00281 |
| 2017/0206403 A1* | 7/2017 | Rambach | G06K 9/00288 |
| 2018/0342110 A1* | 11/2018 | Miao | G06T 19/20 |
| 2019/0188456 A1* | 6/2019 | Shibata | G06K 9/00281 |
| 2019/0220653 A1* | 7/2019 | Wang | G06K 9/00268 |
| 2019/0311183 A1* | 10/2019 | Wang | G06T 7/168 |

\* cited by examiner

US 10,643,063 B2

FEATURE MATCHING WITH A SUBSPACE SPANNED BY MULTIPLE REPRESENTATIVE FEATURE VECTORS

BACKGROUND

The following relates generally to object recognition, and more specifically to feature matching with a subspace spanned by multiple representative feature vectors.

Object recognition may refer to a field of computer vision for finding and identifying objects in an image or video sequence. As an example of object recognition, facial recognition may refer to a process used to identify or verify a person (e.g., from a digital image, a frame of a video clip, etc.) based on one or more facial features. Generally, facial features may be extracted from the image and compared with features stored in a database. Additionally or alternatively, the extracted facial features may be fed to a classifier, which may in turn generate an identity hypothesis based on the input features. Facial recognition may involve one or more steps including face detection, face tracking, facial landmark detection, face normalization, feature extraction, identification/verification, or a combination thereof. In some cases, facial recognition may be based at least in part on processing the digital image or video frame using a convolutional neural network (CNN).

Generally, a CNN may refer to a class of feed-forward artificial neural networks in which the connectivity pattern between nodes of the neural network resembles that of neurons in various biological processes. CNNs for facial recognition may be computationally complex, utilizing large amounts of memory, processing, power, time, etc. There currently exist a variety of portable computing devices, such as portable wireless telephones, personal digital assistants (PDAs), laptop computers, tablet personal computers, eBook viewers, and the like. More specifically, some of these devices may include digital imaging sensors for taking photos (and video) as well as components for communicating voice and data packets over wired or wireless networks (e.g., for downloading videos and images). Such devices may benefit from improved facial recognition techniques (e.g., to reduce memory requirements, processing load, power consumption, time, etc.).

SUMMARY

The described techniques relate to improved methods, systems, devices, and apparatuses that support feature matching with a subspace spanned by multiple representative feature vectors. Generally, the described techniques provide for robust object recognition (e.g., pose invariant facial recognition). In aspects of the following, multiple representative feature vectors for an object may be identified. A subspace spanned by the representative feature vectors may be derived. Techniques for selecting representative feature vectors are discussed further below. For a specific probe feature vector (e.g., corresponding to a query image), a reconstructed feature vector within the subspace may be compared with the probe feature vector. The similarity between the reconstructed feature vector and the probe feature vector may be used for object identification and authentication. That is, if the reconstructed feature vector is close to the probe feature vector, identification and authentication may be verified. For example, a least squares method may be used to compare the reconstructed feature vector with the given probe feature vector.

A method of object recognition at a device including is described. The method may include generating a subspace based on a set of representative feature vectors for an object, obtaining an array of pixels representing an image, determining, by an image signal processor of the device, a probe feature vector for the image by applying a convolutional operation to the array of pixels, creating a reconstructed feature vector in the subspace based on the set of representative feature vectors and the probe feature vector, comparing the reconstructed feature vector and the probe feature vector, and recognizing the object in the image based on the comparison.

An apparatus for object recognition at a device including is described. The apparatus may include a processor, memory in electronic communication with the processor, and instructions stored in the memory. The instructions may be executable by the processor to cause the apparatus to generate a subspace based on a set of representative feature vectors for an object, obtain an array of pixels representing an image, determine, by an image signal processor of the device, a probe feature vector for the image by applying a convolutional operation to the array of pixels, create a reconstructed feature vector in the subspace based on the set of representative feature vectors and the probe feature vector, compare the reconstructed feature vector and the probe feature vector, and recognize the object in the image based on the comparison.

A non-transitory computer-readable medium storing code for object recognition at a device including is described. The code may include instructions executable by a processor to generate a subspace based on a set of representative feature vectors for an object, obtain an array of pixels representing an image, determine, by an image signal processor of the device, a probe feature vector for the image by applying a convolutional operation to the array of pixels, create a reconstructed feature vector in the subspace based on the set of representative feature vectors and the probe feature vector, compare the reconstructed feature vector and the probe feature vector, and recognize the object in the image based on the comparison.

In some examples of the method, apparatus, and non-transitory computer-readable medium described herein, creating the reconstructed feature vector may include operations, features, means, or instructions for determining a vector of weighting coefficients for the set of representative feature vectors based on the probe feature vector and creating the reconstructed feature vector based on a linear combination of the set of representative feature vectors, where the linear combination may be based on the vector of weighting coefficients.

Some examples of the method, apparatus, and non-transitory computer-readable medium described herein may further include operations, features, means, or instructions for generating a representative feature vector matrix, where each row of the representative feature vector matrix includes a respective feature vector of the set of representative feature vectors, generating a transposed representative feature vector matrix by transposing the representative feature vector matrix and computing a projection matrix based on the representative feature vector matrix and the transposed representative feature vector matrix, where the reconstructed feature vector may be created based on the projection matrix.

Some examples of the method, apparatus, and non-transitory computer-readable medium described herein may further include operations, features, means, or instructions for computing a vector of weighting coefficients by multiplying the projection matrix and the probe feature vector, where the reconstructed feature vector may be created based on the vector of weighting coefficients.

In some examples of the method, apparatus, and non-transitory computer-readable medium described herein, creating the reconstructed feature vector may include operations, features, means, or instructions for multiplying the representative feature vector matrix by the vector of coefficients.

In some examples of the method, apparatus, and non-transitory computer-readable medium described herein, the projection matrix may be computed prior to obtaining the array of pixels representing the image.

In some examples of the method, apparatus, and non-transitory computer-readable medium described herein, generating the subspace may include operations, features, means, or instructions for obtaining a set of training images representing the object, where each training image includes a respective array of pixels, determining a set of candidate feature vectors for each training image by applying the convolutional operation to the respective array of pixels, aggregating the set of candidate feature vectors for each training image into a combined set of candidate feature vectors and selecting the set of representative feature vectors from the set of candidate feature vectors, where the subspace may be generated based on the set of representative feature vectors.

In some examples of the method, apparatus, and non-transitory computer-readable medium described herein, selecting the set of representative feature vectors from the set of candidate feature vectors may include operations, features, means, or instructions for computing an average feature vector for the set of candidate feature vectors and comparing each candidate feature vector to the average feature vector, where the set of representative feature vectors may be selected based on the comparisons.

In some examples of the method, apparatus, and non-transitory computer-readable medium described herein, selecting the set of representative feature vectors from the set of candidate feature vectors may include operations, features, means, or instructions for computing a first average feature vector for the set of candidate feature vectors, selecting a first representative feature vector from the set of candidate feature vectors based on the first average feature vector, generating a second set of candidate feature vectors by applying the first representative feature vector to each candidate feature vector, computing a second average feature vector for the second set of candidate feature vectors and selecting a second representative feature vector from the second set of candidate feature vectors based on the second average feature vector.

In some examples of the method, apparatus, and non-transitory computer-readable medium described herein, the object includes a face and each training image includes a respective representation of the face.

In some examples of the method, apparatus, and non-transitory computer-readable medium described herein, the convolutional operation includes a convolutional neural network (CNN), the CNN including one or more convolution layers, one or more normalization layers, one or more maximum feature mapping layers, one or more pooling layers, or a combination thereof.

DETAILED DESCRIPTION

Object recognition refers to a field of computer vision for finding and identifying objects in an image or video sequence. Though aspects of the following are described in the context of facial recognition, it is to be understood that the described techniques may be extended to recognition of other objects in an image (e.g., animals, inanimate objects, etc.) without deviating from the scope of the present disclosure. Facial recognition refers to the process of identifying or verifying a person from a digital image or video frame. For example, facial recognition may compare selected facial features from the image to a face database. In some examples, facial recognition may be achieved based at least in part on processing an image using a CNN. For example, the CNN may process the image using a number of layers to generate feature maps, which may be analyzed and combined.

In some cases, improved robustness for object recognition techniques may be desired. Examples of such techniques that may benefit from improved robustness include pose invariant facial recognition techniques (e.g., or more generally perspective invariant object recognition techniques). In accordance with aspects of the following, such robustness may be provided by generating a subspace based at least in part on a set of representative feature vectors for an object. Techniques for selecting the set of representative feature vectors are discussed further below. A probe feature vector for a given query image may be generated by applying a convolutional operation (e.g., a CNN) to the array of pixels representing the query image. A reconstructed feature vector in the subspace may be created based at least in part on the set of representative feature vectors and the probe feature vector. A device may compare the reconstructed feature vector and the probe feature vector and recognize an object in the image based at least in part on the comparison.

Aspects of the disclosure are initially described in the context of a digital image and process flows related to feature matching with a subspace spanned by multiple representative feature vectors. Aspects of the disclosure are further illustrated by and described with reference to apparatus diagrams, system diagrams, and flowcharts that relate to feature matching with a subspace spanned by multiple representative feature vectors.

Figure 1:
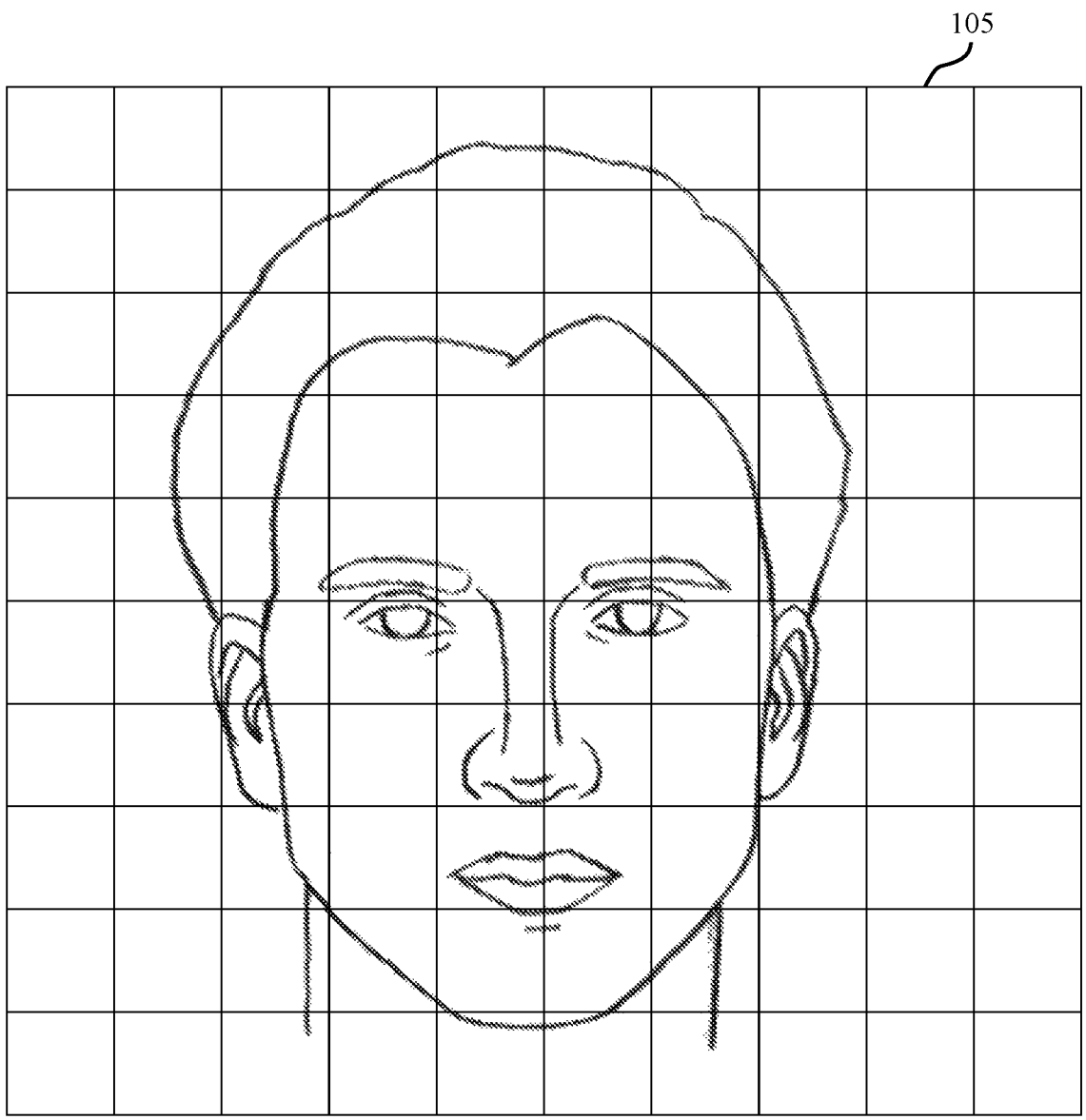
FIG. 1 illustrates an example of a digital image that supports feature matching with a subspace spanned by multiple representative feature vectors in accordance with aspects of the present disclosure.

FIG. 1 illustrates an example of a digital image 100 that supports feature matching with a subspace spanned by multiple representative feature vectors in accordance with aspects of the present disclosure. Digital image 100 may be obtained in a variety of ways in accordance with the present disclosure. For example, digital image 100 may be obtained by an image sensor such as a camera which is interoperable with a processor capable of implementing aspects of the present disclosure. Additionally or alternatively, digital image 100 may be obtained by a device (e.g., a wireless device) via a transmission received from another device (e.g., over a wireless link, a wired link, a portable memory, etc.).

The device may process digital image 100 by applying operations to pixels 105 (e.g., to extract facial features which may be used for facial recognition or classification). Such processing may generally include one or more of face detection, face tracking, facial landmark detection, face normalization, feature extraction, and identification/verification.

Facial detection refers to identifying the presence of one or more faces in an image or video frame such as digital image 100. For example, face detection algorithms may use template matching techniques to locate faces within digital image 100. In one example, template matching may contain Haar feature extraction, integral image generation, adaptive boosting (Adaboost) training, and cascaded classifiers. Such template matching may include application of a sliding window to digital image 100. For each window, the Haar features of the current window may be computed from an integral image (e.g., which may be computed prior to beginning template matching). These Haar features may be selected by an Adaboost algorithm and may be used to effectively distinguish windows containing faces from those that do not contain faces (e.g., using a cascaded classifier). By way of example, the cascaded classifier may classify the current window into two categories, one for windows containing faces and one for windows that do not contain faces. If one classifier classifies the window as not containing any faces, the window may be discarded. Otherwise (e.g., if the classifier classifies the window as containing a face), another classifier (which is said to be cascaded with the first classifier) may be used to re-test the window. Any windows classified by each cascaded classifier as containing a face may be labeled as facial candidates. After all such windows have been classified, a non-max suppression algorithm may be used to group the face windows around each face to generate the final result of the detected face.

Face tracking may be used to track faces across frames of a video stream. Because facial detection and recognition may be time consuming, it may not be realistic to detect or recognize faces for every frame. Face tracking techniques may be used for recognized faces to reduce the facial recognition time. That is, if a face has been recognized, a facial recognition algorithm may in some cases skip facial recognition in the following several frames (e.g., if the face can be tracked successfully). As an example, face tracking techniques may detect some key points from a detected face in the previous frame. For example, these detected key points may be significant corners on the face such as facial landmarks (e.g., mouth corners, eyes, nose, ears, etc.). The key points may be matched on the current frame with template matching (e.g., using optical flow or local feature matching). Examples of local features include histogram of gradient, local binary pattern (LBP), etc. Based on the tracking results of the key points between the previous frame and the current frame, the faces in the current frame may be located. Other tracking methods may be based on the face detection results. For example, the intersection over union (IOU) of face bounding boxes may be used to determine a correlation between the face detected in the current frame and the face detected in the previous frame. In some cases, two or more tracking techniques may be combined to yield more robust tracking results. Face tracking may reduce facial recognition time (e.g., significantly), which in turn may save processing bandwidth and power consumption.

Facial landmark detection may provide information for face normalization. A landmark detection algorithm may improve the face recognition accuracy. An example landmark detection algorithm is provided in the context of a cascade of regressors method. For example, a cascade of regressors may be learned from faces with labeled landmarks. The combined outputs of the cascade of regressors may provide accurate estimation of landmark locations. That is, the local distribution of features around each landmark may be learned, and the regressors may give the most probable displacement of the landmark from the estimate of the previous regressor.

Face normalization may refer to processing the face image (e.g., digital image 100) to provide facial alignment (e.g., for better recognition results). By way of example, a face normalization method may take two eye centers (e.g., pupils) as reference points. A face image may be translated, rotated, and scaled to adjust the location and/or size of the two eye centers (e.g., using a similarity transform). Alternatively, some face normalization techniques may use more than two points (e.g., two eye centers, two mouth corners, and a nose tip) as reference points. For example, these landmarks may be based on or identified during the facial landmark detection discussed above. In addition to (e.g., or instead of) size normalization, the illumination of the face images to be compared may be normalized. An example illumination normalization method is described in the context of local image normalization. Using a sliding window, each image patch (e.g., each group of pixels 105) may be normalized (e.g., in terms of mean and standard deviation of illumination values). Specifically, the center pixel 105 illumination value may be subtracted from the mean of the local patch and then divided by the standard deviation of the local patch. Another method for lighting compensation may be based on a discrete cosine transform (DCT). The second coefficient of the DCT may represent the change of the first half of a signal relative to the second half of the signal using a cosine signal. Such information may, for example, be used to compensate for lighting differences caused by side light (e.g., which can cause one half of a face to be brighter than the other half of the face). Removing the second coefficient of the DCT transform and doing an inverse DCT may provide left-right lighting normalization.

Feature extraction generally starts from an initial set of measured data (e.g., pixels 105 of digital image 100) and builds derived values (i.e., features), which may in turn facilitate subsequent learning and/or generalization. Generally, feature extraction may reduce repetitiveness of digital image 100 by transforming the pixels 105 into a reduced set of feature maps. The described techniques may provide for efficient feature extraction in the context of object recognition.

Face identification may refer to the process used to select which identifier with which to associate a face. Similarly, face verification may refer to the process used to verify if a face corresponds to an alleged identity. For face identification, a database containing the features of one or more registered faces may be compared with the extracted features of a given query face image (such as digital image 100). For example, the identifier of a registered face which most closely matches the extracted features may be assigned to the query face image. In some cases, similarity may be measured with distance between features (e.g., cosine distance, Euclidean distance, Manhattan distance, Mahalanobis distance). Another method for face identification may apply classification methods, such as support vector machines, to train classifiers which classify different faces using registered face images and other training images. The query face features may be fed into the classifier, and the output of the classifier may be the identifier of the face. For face verification, the provided face image (e.g., digital image 100) may be compared with one or more registered faces. This comparison may be done via metric distance (e.g., Euclidean distance) comparison or using a classifier trained with one or more registered faces of a given person. Face verification may be related to access control for a device and may therefore be associated with higher accuracy than face identification in some examples. That is, metrics around which to optimize face verification may differ from those around which to optimize face identification. As an example, face verification may attempt to reduce false positives (e.g., to prevent unlicensed access to a device). Alternatively, face identification may attempt to reduce a rejection rate (e.g., the percentage of faces not recognized due to the matching scores or classification results falling below a recognition threshold) without significantly suppressing recognition.

Aspects of the present disclosure relate to improved techniques for object recognition. A device (e.g., a mobile device) may generate a subspace based at least in part on a set of representative feature vectors for an object. The device may obtain an array of pixels 105 representing a digital image 100. The device may determine a probe feature vector for the image by applying a convolutional operation to the array of pixels 105 (e.g., by applying a convolutional operation as described with reference to FIG. 3 to digital image 100). The device may create a reconstructed feature vector in the subspace based at least in part on the set of representative feature vectors and the probe feature vector. The device may compare the reconstructed feature vector and the probe feature vector and recognize the object in the image based at least in part on the comparison. For example, the described techniques may support pose invariant facial recognition or other such object recognition applications.

Figure 2:
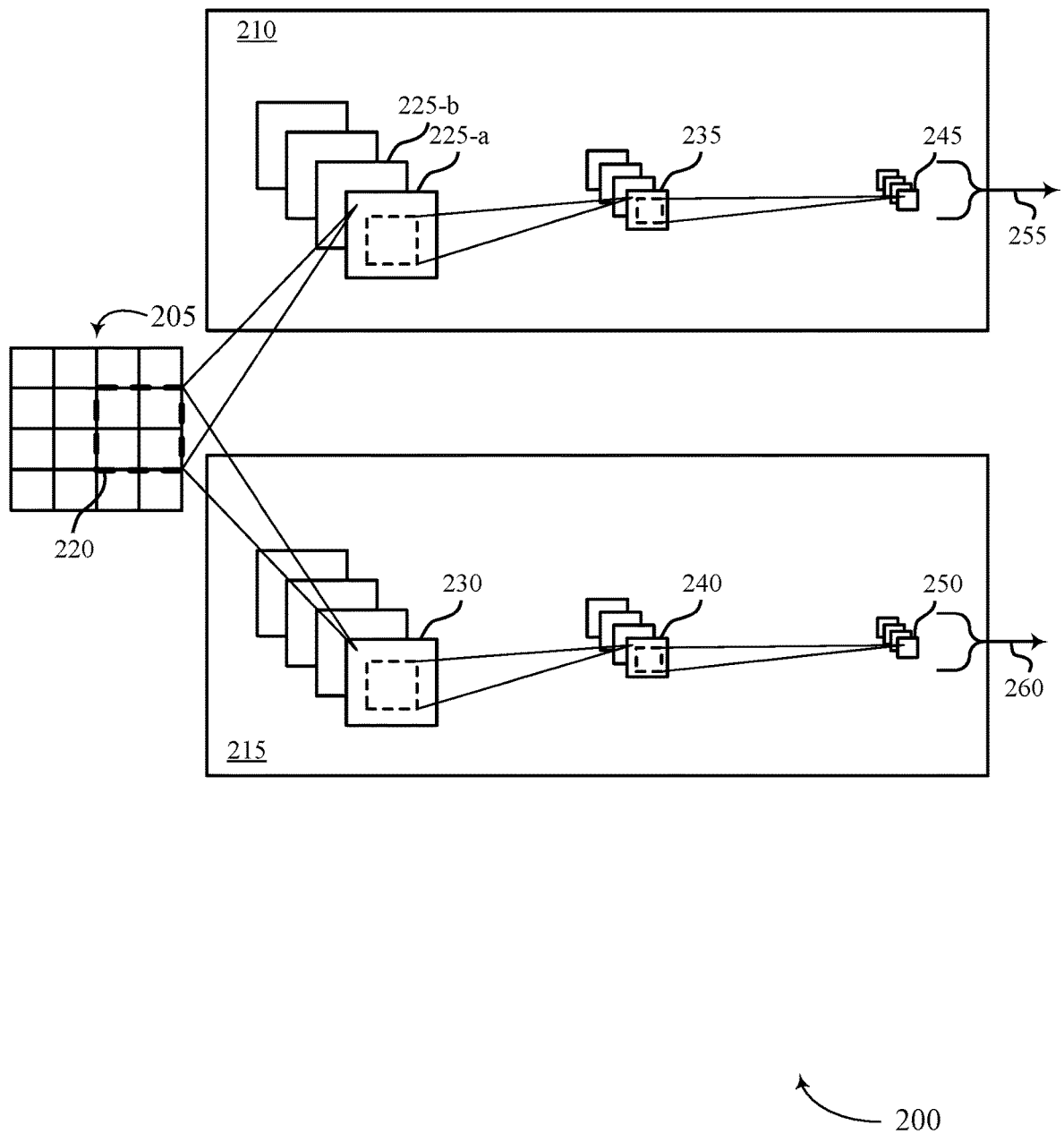
FIG. 2 illustrates an example of a process flow that supports feature matching with a subspace spanned by multiple representative feature vectors in accordance with aspects of the present disclosure.

FIG. 2 illustrates an example of a process flow 200 that supports feature matching with a subspace spanned by multiple representative feature vectors in accordance with aspects of the present disclosure. For example, process flow 200 may in some cases be performed by a device performing the processing operations described with reference to digital image 100. Additionally or alternatively, process flow 200 may be performed by another device (e.g., a server, a remote device, or the like), and the output of process flow 200 may be communicated to the device (e.g., via a wireless link, via a non-transitory computer readable medium, or the like).

By way of example, process flow 200 may relate to a pixel array 205 (e.g., which may be an example of digital image 100). Pixel array 200 may in some cases represent an image used to train (e.g., or query) a facial recognition system. Although illustrated as containing sixteen pixels for the sake of illustration, it is to be understood that pixel array 205 may include any suitable number of pixels.

Process flow 200 may include a first set of feature map operations 210 and a second set of feature map operations 215. In some cases, the first set of feature map operations 210 and the second set of feature map operations 215 may comprise analogous feature map operations (e.g., the same mathematical operations may be applied in each set, with possibly different parameters used for each respective set). Though illustrated as being performed on a same pixel array 205, it is to be understood that in some cases the first set of feature map operations 210 may be performed on a first training image (e.g., a first pixel array 205) while the second set of feature map operations 215 may be performed on a second training image (e.g., a second pixel array 205).

For example, the first set of feature map operations 210 may include generation of a first set of feature maps 225. By way of example, feature map 225-a may be generated by iteratively applying a first kernel to pixel array 205, where iteratively applying the first kernel comprises stepping (e.g., striding) the first kernel across pixel array 205. For example, the first kernel may apply a first set of weights to each pixel in region 220 to generate a first feature element for feature map 225-a. The first kernel may then apply the first set of weights to each pixel in another region of pixel array 205 (e.g., where the other region is related to region 220 by some stride size). Similarly, feature map 225-b may be generated by iteratively applying a second kernel to pixel array 205 (e.g., where the second kernel may apply a second set of weights to each region of pixel array 205). Likewise, feature map 230 may be generated by iteratively applying a third kernel to pixel array 205 (e.g., where the third kernel may apply a third set of weights to each region of pixel array 205).

As illustrated, process flow 200 may in some cases include multiple layers, where each layer is associated with a respective set of feature maps. Thus, feature map 235 may be generated by applying a fourth kernel to feature map 225-a (e.g., where the fourth kernel may apply a fourth set of weights to each region of feature map 225-a). As discussed with reference to pixel array 205, the regions of feature map 225-a to which the fourth kernel is applied may be based on a stride size (e.g., which may be different from the stride size used for pixel array 205). Similarly, feature map 240 may be generated by applying a fifth kernel to feature map 230 (e.g., where the fifth kernel may apply a fifth set of weights to each region of feature map 230).

Analogous techniques may be used to generate feature map 245 from feature map 235 (e.g., and to generate feature map 250 from feature map 240). Though illustrated with three layers, it is to be understood that process flow 200 may include any suitable number of layers. Additionally, in some cases, the first set of feature map operations 210 and the second set of feature map operations 215 may include different numbers of layers (e.g., or include a different number of feature maps for each layer or be otherwise distinct from each other).

In some cases, the last layers of the first set of feature map operations 210 and the second set of feature map operations 215 (e.g., the layers containing feature map 245 and feature map 250) may be referred to as fully-connected layers. In accordance with the described techniques, process flow 200 may produce a first output 255 (from the first set of feature map operations 210) and a second output 260 (from the second set of feature map operations 215). For example, when generating a subspace for object recognition, the first output 255 may comprise a first set of candidate feature vectors for pixel array 205 while the second output 260 may comprise a second set of candidate feature vectors for pixel array 205 (e.g., or for a second pixel array 205 representing a second training image). In some such cases, the candidate sets of feature vectors may be aggregated (e.g., for two or more training images) and a set of representative vectors may be selected, as described with reference to FIG. 4. When performing facial recognition for a query image (e.g., represented by pixel array 205), a single set of feature map operations may be performed (e.g., such that first output 255 may represent a probe feature vector).

Figure 3:
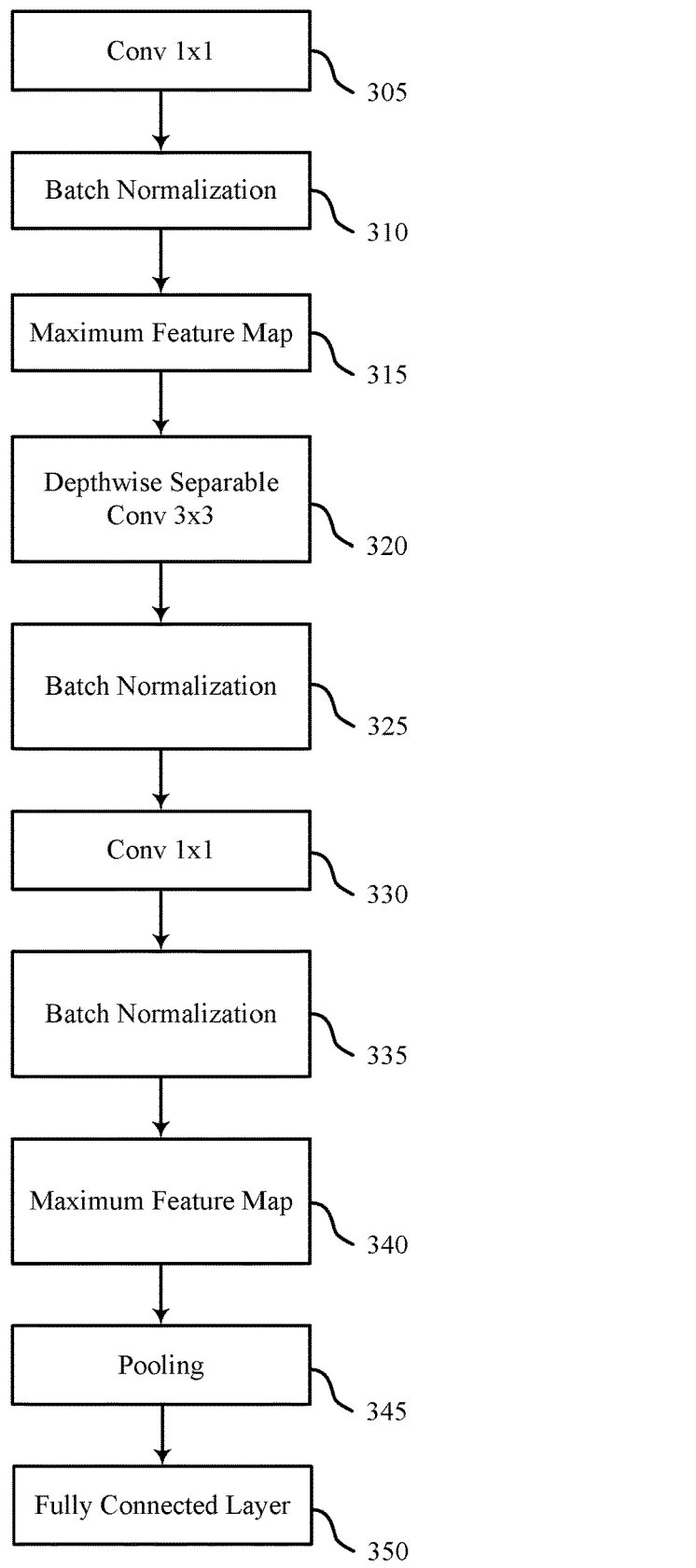
FIG. 3 illustrates an example of a convolutional operation that supports feature matching with a subspace spanned by multiple representative feature vectors in accordance with aspects of the present disclosure.

FIG. 3 illustrates an example of a convolutional operation 300 that supports feature matching with a subspace spanned by multiple representative feature vectors in accordance with aspects of the present disclosure. For example, convolutional operation 300 may be implemented (e.g., by a processor of a wireless device) as part of a CNN for facial recognition.

In some examples, a device performing convolutional operation 300 may obtain a two-dimensional pixel array (e.g., an image such as digital image 100) for processing. In various examples, the image may be obtained using a sensor such as a camera, may be downloaded via a wireless communication link, may be uploaded from a transportable memory, may be accessed from a database, etc.

At 305, the device may apply a 1×1 convolution layer to a plurality of feature maps (e.g., which may be generated from the two-dimensional pixel array or may be received from a previous iteration of convolutional operation 300). For example, the 1×1 convolution layer may apply one or more 1×1 kernels to each input channel to generate respective output channels. In aspects of the present disclosure, channels and feature maps may be used interchangeably to refer to a reduced set of pixels from an image.

At 310, a batch normalization layer may be applied to the output(s) of the 1×1 convolution layer (e.g., to remove or reduce covariate shift). For example, the batch normalization layer may normalize a mean of the values within or across feature maps, a variance of the values within or across feature maps, etc.

At 315, a maximum feature map (MFM) operation may be used to strategically merge channels. For example, each MFM layer may extract a greater value from a pair of values from designated channels to form a new channel from the original two channels. Though described in the context of operating on a pair of input channels to generate a single output channel, it is to be understood that the MFM layer may extract a greatest value from any suitable number of input channels (e.g., three, four, etc.) to generate a single output channel without deviating from the scope of the present disclosure. In the example of a pair of input channels, the number of output channels from the MFM operation at 315 may be half the number of input channels that are received at 315. In some cases, the MFM operation may replace (e.g., or supplement) an activation layer, such as a rectified linear unit (ReLU) activation function.

At 320, a 3×3 depth-wise separable convolution layer may be applied to the output channels from the MFM operation at 315. For example, the depth-wise separable convolution may traverse each of the output channels from 315 (e.g., which may be referred to as input channels at 320) with a single (e.g., or respective) 3×3 kernel to generate a set of feature maps corresponding to the input channels at 320. For example, in the case that sixteen input channels are received at 320, sixteen feature maps may be generated using the 3×3 kernel. Each of these feature maps may then be traversed by a given number (e.g., corresponding to the desired number of channels to be output from 320) of 1×1 (or other sized) convolutions to generate a second set of feature maps. For example, and returning to the example introduced above, if thirty-two channels are to be output from 320, each of the sixteen feature maps generated using the 3×3 kernel may be traversed by 32 1×1 convolutions to generate the second set of feature maps.

Subsequently, one feature map of the second set of feature maps for each of the original input channels at 320 may be selected and combined to generate the desired number (e.g., thirty-two) of output channels. That is, each combination operation may be performed across sixteen feature maps, one for each of the original input channels. Thus, the depth-wise separable convolution may be said to include a first operation applied to each input channel to generate a set of feature maps followed by a second combining operation applied across the set of feature maps to generate the output channels The depth-wise separable convolution layer may reduce the number of parameters to be computed compared to a regular convolution while still achieving the same results. That is, because the number of input channels for the depth-wise separable convolution kernels may be one, depth-wise separable convolution may reduce the weights of convolution.

At 325, batch normalization may be performed on the channels output from 320 (e.g., to remove covariate shift). A 1×1 convolution layer at 330 (e.g., which may use the same kernels as the 1×1 convolution layer at 305 or may use different kernels) with batch normalization at 335 follows. For example, aspects of convolutional operation 300 may mimic the functionality of a 3×3 convolution with fewer weights involved, which can further reduce the computation of convolutions. Another MFM layer at 340 further reduces the number of output channels (e.g., as described with reference to the MFM layer at 315). In some cases, the MFM layer at 340 may combine a different number of feature maps than the MFM layer at 315 (e.g., three instead of two, two instead of four, etc.). At 345, a pooling layer may be used (e.g., to reduce the size or complexity of the remaining channels). At 350, a fully connected layer may be used to generate a feature vector (e.g., a candidate feature vector in the case of training or a probe feature vector in the case of object recognition).

It is to be understood that convolutional operation 300 is described for the sake of example and is not necessarily limiting of scope. Aspects of convolutional operation 300 may be rearranged, supplemented, or omitted without deviating from the scope of the present disclosure. Generally, convolutional operation 300 may include one or more convolution layers, one or more normalization layers, one or more MFM layers, one or more pooling layers, or a combination thereof.

Figure 4:
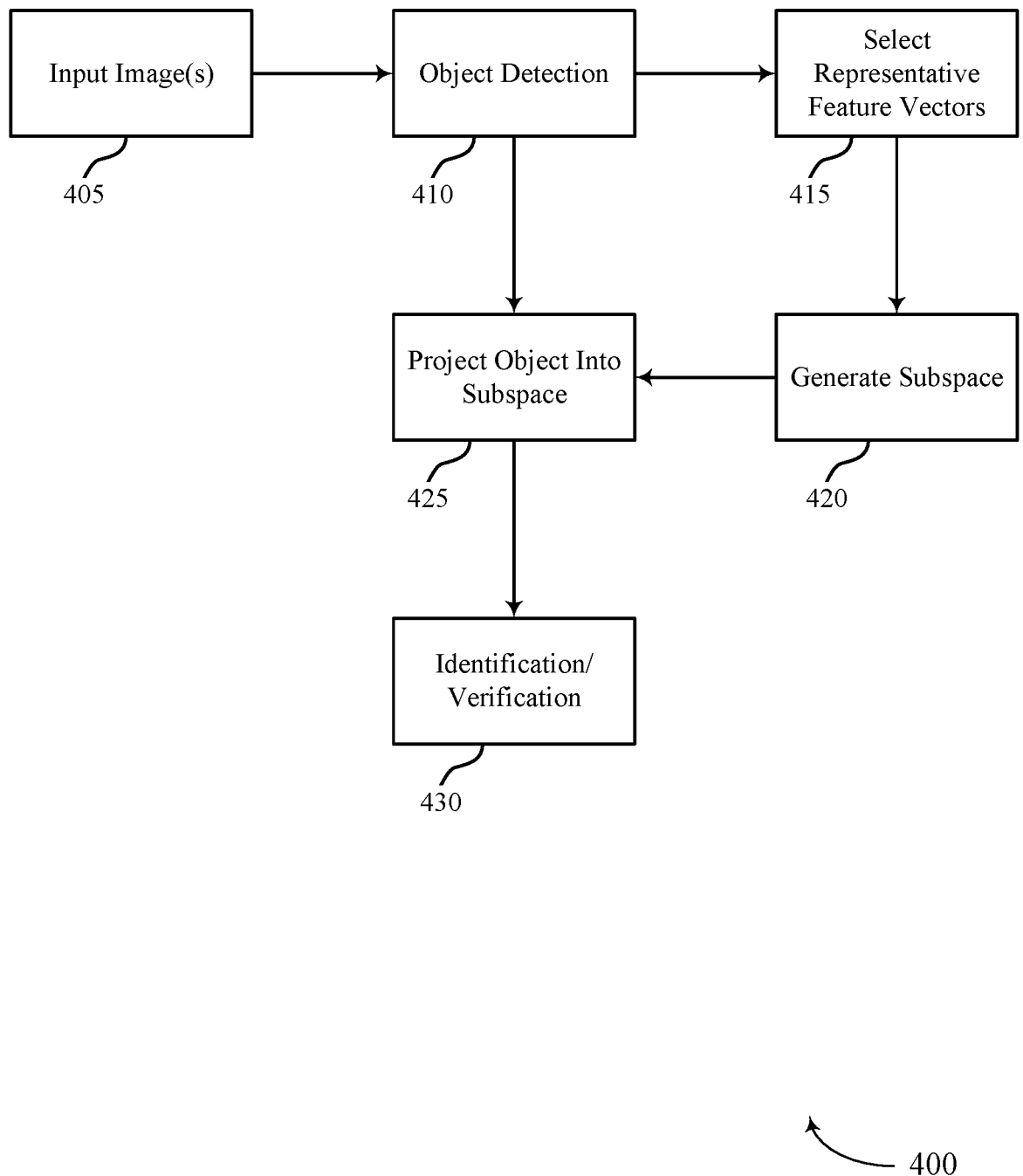
FIG. 4 illustrates an example of a process flow that supports feature matching with a subspace spanned by multiple representative feature vectors in accordance with aspects of the present disclosure.

FIG. 4 illustrates an example of a process flow 400 that supports feature matching with a subspace spanned by multiple representative feature vectors in accordance with aspects of the present disclosure. For example, process flow 400 may in some cases be performed by a device performing the processing operations described with reference to digital image 100. Additionally or alternatively, process flow 400 (e.g., or portions thereof) may be performed by another device (e.g., a server, a remote device), and the output of process flow 400 may be communicated to the device (e.g., via a wireless link, via a non-transitory computer readable medium, or the like).

Aspects of process flow 400 may relate to a feature-matching method which is predicated on the assumption that a reconstructed feature vector of an object should be similar to (e.g., within some distance of) the linear combination of multiple representative feature vectors of the same object (e.g., and should not be similar to the linear combination of multiple representative feature vectors of a different object).

At 405, one or more input images may be obtained. For example, multiple input images may be used to select a set of representative feature vectors (e.g., at 415). As an example, the multiple images may comprise a video stream. In some examples, each image of the multiple input images may include a different perspective of a given object (e.g., a different facial pose). Additionally or alternatively, a single input image may be used to generate a probe feature vector (e.g., for a query image).

At 410, object detection may be performed for the input image(s). An example of object detection is provided in the context of facial detection (e.g., as described with reference to FIG. 1). For example, face detection algorithms may use template matching techniques to locate faces within the input image(s).

At 415, the device may select a set of representative feature vectors (e.g., in the case of multiple input images for generating the subspace at 420). For example, the device may apply a convolutional operation (e.g., as described with reference to FIGS. 2 and 3) to each of the input images to generate multiple sets of candidate feature vectors (e.g., one set of candidate feature vectors for each input image). For example, N (e.g., N=256) features may be extracted from a fully-connected layer for each input image. In aspects of the following N may alternatively refer to the number of features extracted across the entire set of input images (e.g., or a subset thereof).

The set of representative feature vectors may be selected from the set(s) of N candidate feature vectors. In some examples, all of the candidate feature vectors may be normalized (e.g., to norm 1). Various techniques for selecting the set of representative feature vectors from the N feature vectors are considered in accordance with aspects of the present disclosure. One such technique may be referred to as a greedy search method. A second such technique may be referred to as an orthogonal vectors method. It is to be understood that these techniques are provided for the sake of explanation and are not limiting of scope (e.g., such that similar techniques may be used to select the set of representative feature vectors without deviating from the scope of the present disclosure).

For the greedy search method, the mean $$\overline{F} = \frac{1}{N} \sum_{i=1}^{N} F_i$$

of all the feature vectors $F_i$ may be calculated. Then, the feature vector $F_{k_0}$ which is closest (e.g., in terms of magnitude and/or orientation) to $\overline{F}$ may be selected as the first representative feature vector. Next, distances for each of the remaining vectors to $F_{k_0}$ may be calculated as $D_i^1 = \|F_{k_0} - F_i\|_2$. The feature vector $F_{k_1}$ which produces the greatest distance may be selected as the second representative feature vector. The third representative feature vector $F_{k_2}$ may similarly be selected as the feature vector that has greatest distance from the mean of $$\frac{F_{k_0} + F_{k_1}}{2}.$$

The remaining representative feature vectors may be selected in the same way.

For the orthogonal vectors method, the mean $$\overline{F} = \frac{1}{N} \sum_{i=1}^{N} F_i$$

of all the feature vectors $F_i$ may be calculated, and the feature vector $F_{k_0}$ which is closest to $\overline{F}$ may be selected as the first representative feature vector (e.g., as for the greedy search method). $F_{k_0}$ may be selected as the first orthogonal vector onto which the probe vector will project (e.g., at 425). Using an orthonormalization technique (e.g., a Gram-Schmidt process), a set of orthogonal vectors may be constructed by finding the next representative feature vector with the maximum distance to the center of the remaining vectors (e.g., excluding $F_{k_0}$).

Specifically, given $F_{k_0}$ $$F_i^1 = F_i - (F_i \cdot F_{k_0})F_{k_0}, i = 0, \ldots, N-1, \text{ and}$$

$$\overline{F}_i^1 = \frac{1}{N} \sum_{i=1}^{N} F_i^1,$$

from all the $F_i^1$. The next representative feature vector $F_{k_1}$ may be the one with the maximum distance to $\overline{F}_i^1$. In order to select the third representative feature vector $F_{k_2}$ given $F_{k_0}$ and $F_{k_1}$ $$F_i^2 = F_i - (F_i \cdot F_{k_0})F_{k_0} - (F_i \cdot F_{k_1})F_{k_1}, i = 0, \ldots, N-1, \text{ and}$$

$$\overline{F}_i^2 = \frac{1}{N} \sum_{i=1}^{N} F_i^2 \cdot F_{k_2}$$

$F_{k_2}$ may be the next representative feature which corresponds to the $F_i^2$ with the maximum distance to $\overline{F}_i^2$. The remaining representative feature vectors may be selected in the same way.

At 420, a subspace may be generated from the set of representative feature vectors. For example, the subspace may refer to a vector space (e.g., defined by the set of representative feature vectors) that is a subset of a higher-dimension vector space (e.g., corresponding to the N candidate feature vectors).

At 425, a probe feature vector may be generated (e.g., based on applying a convolutional operation to a query image) and projected into the subspace. For example, a least-squares fitting method may be used to calculate a weight of each representative feature vector, and a linear combination of the weighted representative feature vectors may be compared to the probe feature vector (e.g., at 430).

For example, if $A=[\alpha_0, \alpha_1, \ldots, \alpha_{m-1}]^T$ represents the coefficients associated with the representative feature vectors (e.g., a vector of weighting coefficients) and $X_k=[F_{k_0}, F_{k_1}, \ldots, F_{k_{M-1}}]$ represents the representative feature vectors themselves (e.g., where $X_k$ may be referred to herein as a representative feature vector matrix), the projection may attempt to minimize $\|X_k A - Y\|$ (e.g., which may be achieved using a least-squares fitting method). Specifically, if $X_k A = Y$, then $X_k^T X_k A = X_k^T Y$ and $A = (X_k^T X_k)^{-1} X_k^T Y$. If $W = (X_k^T X_R)^{-1} X_k^T$, then $A = WY$ where $Y$ may refer to the probe feature vector.

Since W (e.g., which may be referred to herein as a projection matrix) may be computed beforehand (e.g., prior to receiving a query image), the vector of weighting coefficients A can be computed wth simple WY. With the obtained A, the reconstructed feature vector from the enrolled faces can be given as $\hat{Y}=X_k A$.

At 430, identification (e.g., and/or verification) may be performed (e.g., as described with reference to FIG. 1). For example, Y (i.e., the probe feature vector) may be compared to $\hat{Y}$ (i.e., the reconstructed feature vector), and identification/verification may be performed based on the comparison (e.g., based on a similarity between the two vectors such as a Euclidean distance or the like).

Figure 5:
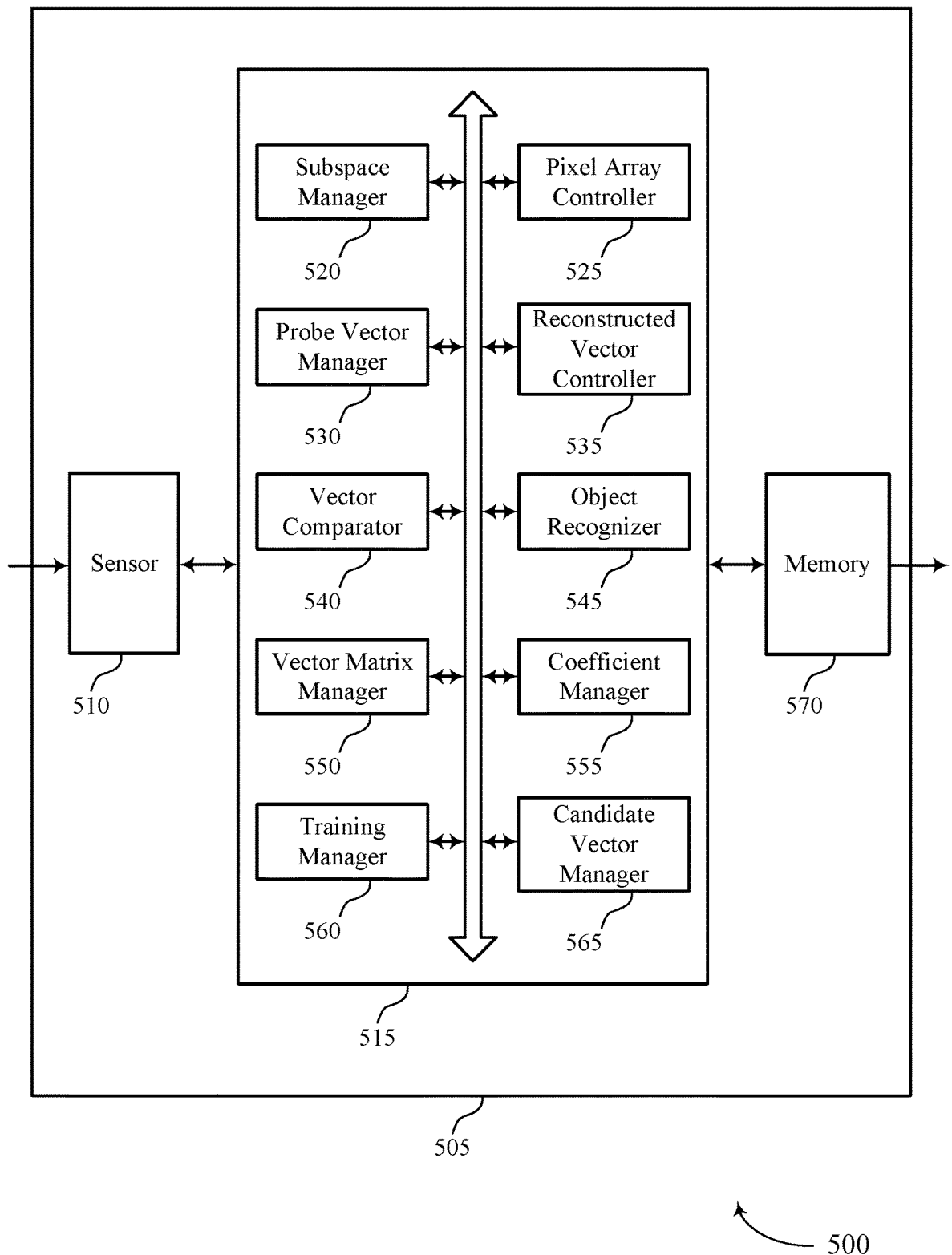
FIG. 5 shows a block diagram of a device that supports feature matching with a subspace spanned by multiple representative feature vectors in accordance with aspects of the present disclosure.

FIG. 5 shows a block diagram 500 of a device 505 that supports feature matching with a subspace spanned by multiple representative feature vectors in accordance with aspects of the present disclosure. The device 505 may include a sensor 510, an image processing block 515, and memory 570. The device 505 may also include a processor. Each of these components may be in communication with one another (e.g., via one or more buses).

Sensor 510 may include or be an example of a digital imaging sensor for taking photos and video. In some examples, sensor 510 may receive information such as packets, user data, or control information associated with various information channels (e.g., from a transceiver 620 described with reference to FIG. 6). Information may be passed on to other components of the device. Additionally or alternatively, components of device 505 used to communicate data over a wireless (e.g., or wired) link may be in communication with image processing block 515 (e.g., via one or more buses) without passing information through sensor 510. In some cases, sensor 510 may represent a single physical sensor that is capable of operating in a plurality of imaging modes. Additionally or alternatively, sensor 510 may represent an array of sensors (e.g., where each sensor may be capable of operating in one or more imaging modes).

Image processing block 515 may be an example of aspects of the image processing block 610 described with reference to FIG. 6. The image processing block 515, or its sub-components, may be implemented in hardware, code (e.g., software or firmware) executed by a processor, or any combination thereof. If implemented in code executed by a processor, the functions of the image processing block 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The image processing block 515, or its sub-components, may be physically located at various positions, including being distributed such that portions of functions are implemented at different physical locations by one or more physical components. In some examples, the image processing block 515, or its sub-components, may be a separate and distinct component in accordance with various aspects of the present disclosure. In some examples, the image processing block 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The image processing block 515 may include a subspace manager 520, a pixel array controller 525, a probe vector manager 530, a reconstructed vector controller 535, a vector comparator 540, an object recognizer 545, a vector matrix manager 550, a coefficient manager 555, a training manager 560, and a candidate vector manager 565. Each of these modules may communicate, directly or indirectly, with one another (e.g., via one or more buses).

The subspace manager 520 may generate a subspace based on a set of representative feature vectors for an object. In some examples, the subspace manager 520 may select the set of representative feature vectors from a set of candidate feature vectors. In some examples, the subspace manager 520 may compute an average feature vector for the set of candidate feature vectors. In some examples, the subspace manager 520 may compare each candidate feature vector to the average feature vector, where the set of representative feature vectors is selected based on the comparisons (e.g., using greedy search techniques as described above).

In some cases, the subspace manager 520 may select the set of representative feature vectors using an orthogonal vector method. For example, the subspace manager 520 may compute a first average feature vector for the set of candidate feature vectors. The subspace manager 520 may select a first representative feature vector from the set of candidate feature vectors based on the first average feature vector. In some examples, the subspace manager 520 may generate a second set of candidate feature vectors by applying the first representative feature vector to each candidate feature vector. In some examples, the subspace manager 520 may compute a second average feature vector for the second set of candidate feature vectors. In some examples, the subspace manager 520 may select a second representative feature vector from the second set of candidate feature vectors based on the second average feature vector.

The pixel array controller 525 may obtain an array of pixels representing an image. For example, the pixel array controller 525 may in some cases be a component of (e.g., or otherwise interoperable with) sensor 510. Additionally or alternatively, pixel array controller 525 may obtain the array of pixels representing the image based on data received from a second device (e.g., via a transceiver as described with reference to FIG. 6).

The probe vector manager 530 may determine a probe feature vector for the image by applying a convolutional operation to the array of pixels. In some cases, the operations of the probe vector manager 530 may be performed by an image signal processor. In some cases, the convolutional operation includes a CNN, the CNN including one or more convolution layers, one or more normalization layers, one or more maximum feature mapping layers, one or more pooling layers, or a combination thereof (e.g., as described with reference to FIG. 3).

The reconstructed vector controller 535 may create a reconstructed feature vector in the subspace based on the set of representative feature vectors and the probe feature vector. In some examples, the reconstructed vector controller 535 may determine a vector of weighting coefficients for the set of representative feature vectors based on the probe feature vector. In some examples, the reconstructed vector controller 535 may create the reconstructed feature vector based on a linear combination of the set of representative feature vectors, where the linear combination is based on the vector of weighting coefficients. In some examples, the reconstructed vector controller 535 may multiply the representative feature vector matrix by the vector of coefficients.

The vector comparator 540 may compare the reconstructed feature vector and the probe feature vector. For example, the vector comparator 540 may be configured with a detection threshold (e.g., a Euclidean distance between the reconstructed feature vector and the probe feature vector).

The object recognizer 545 may recognize the object in the image based on the comparison (e.g., based on a similarity between the reconstructed feature vector and the probe feature vector).

The vector matrix manager 550 may generate a representative feature vector matrix, where each row of the representative feature vector matrix includes a respective feature vector of the set of representative feature vectors. In some examples, the vector matrix manager 550 may generate a transposed representative feature vector matrix by transposing the representative feature vector matrix. In some examples, the vector matrix manager 550 may compute a projection matrix based on the representative feature vector matrix and the transposed representative feature vector matrix, where the reconstructed feature vector is created based on the projection matrix. In some cases, the projection matrix is computed prior to obtaining the array of pixels representing the image.

The coefficient manager 555 may compute a vector of weighting coefficients by multiplying the projection matrix and the probe feature vector, where the reconstructed feature vector is created based on the vector of weighting coefficients.

The training manager 560 may obtain a set of training images representing the object, where each training image includes a respective array of pixels. In some cases, the object includes a face and each training image includes a respective representation of the face.

The candidate vector manager 565 may determine a set of candidate feature vectors for each training image by applying the convolutional operation to the respective array of pixels. In some examples, the candidate vector manager 565 may aggregate the set of candidate feature vectors for each training image into a combined set of candidate feature vectors (e.g., from which the set of representative feature vectors may be selected by the subspace manager 520).

Memory 570 may store information (e.g., facial feature information) generated by other components of the device such as image processing block 515. For example, memory 570 may store facial feature information with which to compare an output of image processing block 515. Memory 570 may comprise one or more computer-readable storage media. Examples of memory 570 include, but are not limited to, random access memory (RAM), static RAM (SRAM), dynamic RAM (DRAM), read-only memory (ROM), electrically erasable programmable read-only memory (EEPROM), compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor (e.g., image processing block 515).

Figure 6:
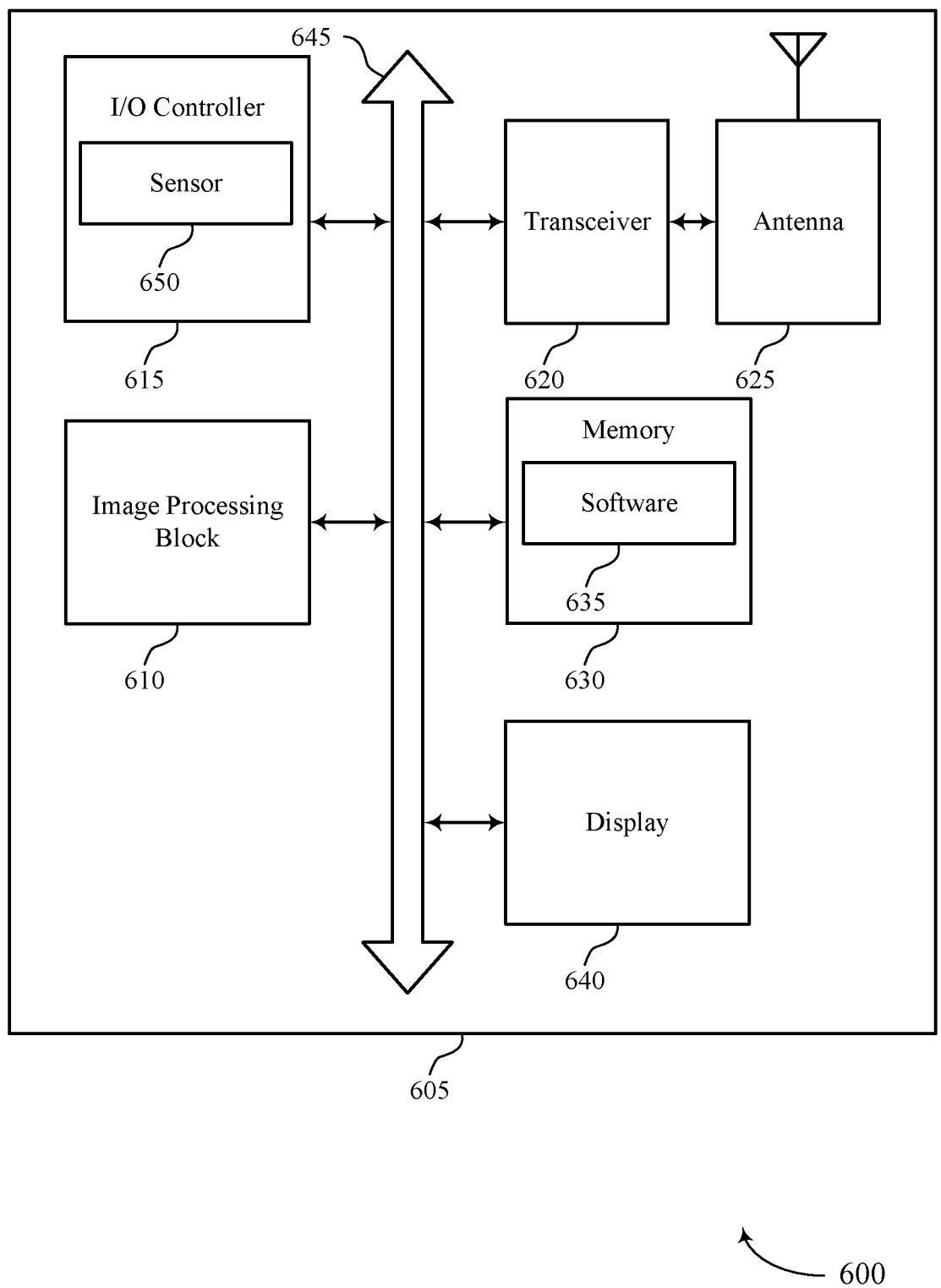
FIG. 6 shows a diagram of a system including a device that supports feature matching with a subspace spanned by multiple representative feature vectors in accordance with aspects of the present disclosure.

FIG. 6 shows a diagram of a system 600 including a device 605 that supports feature matching with a subspace spanned by multiple representative feature vectors in accordance with aspects of the present disclosure. Device 605 may be an example of or include the components of device 505. Device 605 may include components for bi-directional voice and data communications including components for transmitting and receiving communications. Device 605 may include image processing block 610, I/O controller 615, transceiver 620, antenna 625, memory 630, and display 640. These components may be in electronic communication via one or more buses (e.g., bus 645).

Image processing block 610 may include an intelligent hardware device, (e.g., a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, image processing block 610 may be configured to operate a memory array using a memory controller. In other cases, a memory controller may be integrated into image processing block 610. Image processing block 610 may be configured to execute computer-readable instructions stored in a memory to perform various functions (e.g., functions or tasks supporting face tone color enhancement).

I/O controller 615 may manage input and output signals for device 605. I/O controller 615 may also manage peripherals not integrated into device 605. In some cases, I/O controller 615 may represent a physical connection or port to an external peripheral. In some cases, I/O controller 615 may utilize an operating system such as iOS®, ANDROID®, MS-DOS®, MS-WINDOWS®, OS/2®, UNIX®, LINUX®, or another known operating system. In other cases, I/O controller 615 may represent or interact with a modem, a keyboard, a mouse, a touchscreen, or a similar device. In some cases, I/O controller 615 may be implemented as part of a processor. In some cases, a user may interact with device 605 via I/O controller 615 or via hardware components controlled by I/O controller 615. In some cases, I/O controller 615 may be or include sensor 650. Sensor 650 may be an example of a digital imaging sensor for taking photos and video. For example, sensor 650 may represent a camera operable to obtain a raw image of a scene, which raw image may be processed by image processing block 610 according to aspects of the present disclosure.

Transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas. In some cases, the wireless device may include a single antenna 625. However, in some cases the device may have more than one antenna 625, which may be capable of concurrently transmitting or receiving multiple wireless transmissions.

Device 605 may participate in a wireless communications system (e.g., may be an example of a mobile device). A mobile device may also be referred to as a user equipment (UE), a wireless device, a remote device, a handheld device, or a subscriber device, or some other suitable terminology, where the "device" may also be referred to as a unit, a station, a terminal, or a client. A mobile device may be a personal electronic device such as a cellular phone, a PDA, a tablet computer, a laptop computer, or a personal computer. In some examples, a mobile device may also refer to as an internet of things (IoT) device, an internet of everything (IoE) device, a machine-type communication (MTC) device, or the like, which may be implemented in various articles such as appliances, vehicles, meters, or the like.

Memory 630 may comprise one or more computer-readable storage media. Examples of memory 630 include, but are not limited to, RAM, SRAM, DRAM, ROM, EEPROM, CD-ROM or other optical disc storage, magnetic disc storage, or other magnetic storage devices, flash memory, or any other medium that can be used to store desired program code in the form of instructions or data structures and that can be accessed by a computer or a processor. Memory 630 may store program modules and/or instructions that are accessible for execution by image processing block 610. That is, memory 630 may store computer-readable, computer-executable software 635 including instructions that, when executed, cause the processor to perform various functions described herein. In some cases, the memory 630 may contain, among other things, a basic input/output system (BIOS) which may control basic hardware or software operation such as the interaction with peripheral components or devices. The software 635 may include code to implement aspects of the present disclosure, including code to support multi-context real time inline image signal processing. Software 635 may be stored in a non-transitory computer-readable medium such as system memory or other memory. In some cases, the software 635 may not be directly executable by the processor but may cause a computer (e.g., when compiled and executed) to perform functions described herein.

Display 640 represents a unit capable of displaying video, images, text or any other type of data for consumption by a viewer. Display 640 may include a liquid-crystal display (LCD), a LED display, an organic LED (OLED), an active-matrix OLED (AMOLED), or the like. In some cases, display 640 and I/O controller 615 may be or represent aspects of a same component (e.g., a touchscreen) of device 605.

Figure 7:
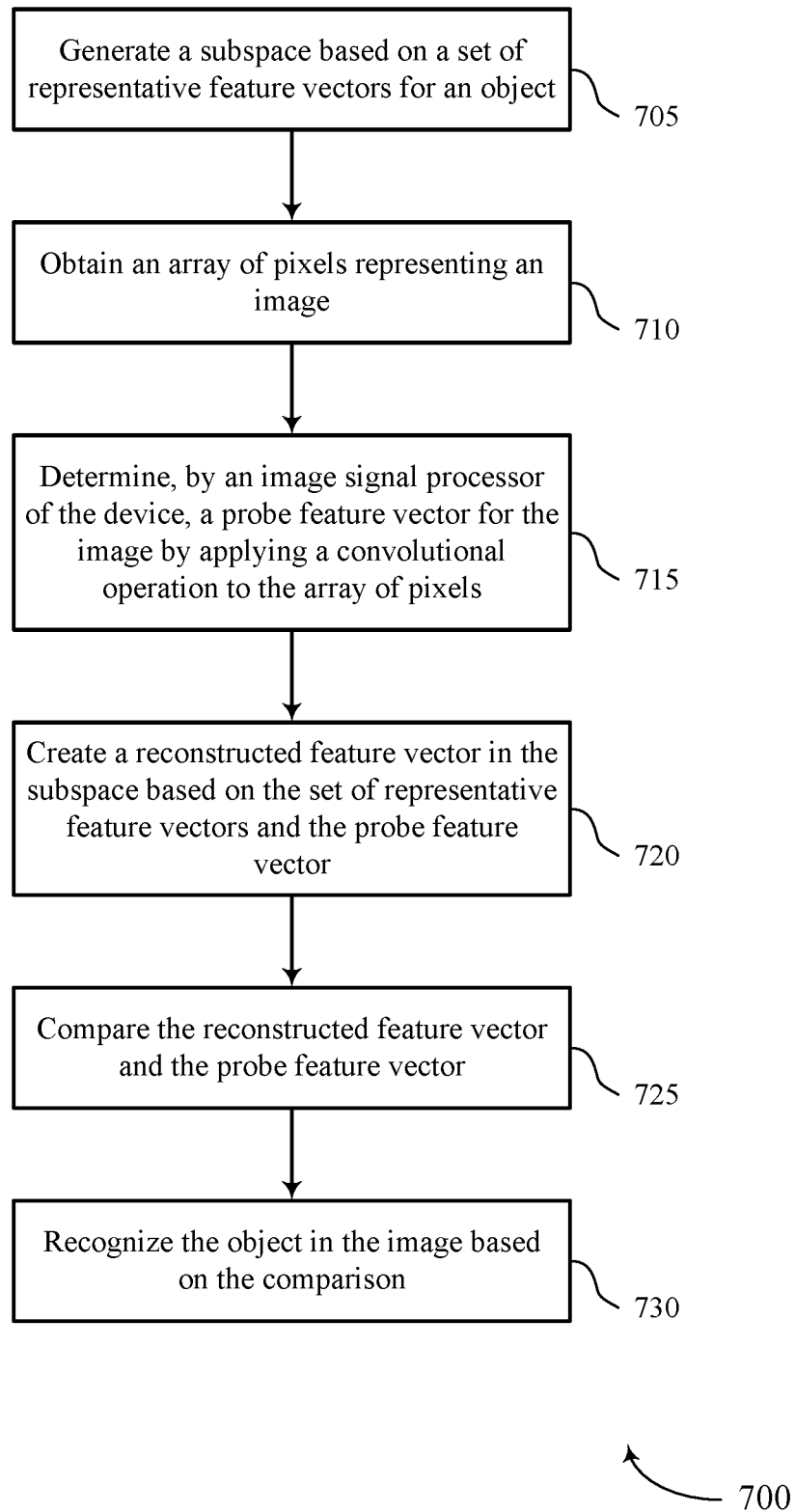
FIGS. 7 through 9 show flowcharts illustrating methods that support feature matching with a subspace spanned by multiple representative feature vectors in accordance with aspects of the present disclosure.

FIG. 7 shows a flowchart illustrating a method 700 that supports feature matching with a subspace spanned by multiple representative feature vectors in accordance with aspects of the present disclosure. The operations of method 700 may be implemented by a device or its components as described herein. For example, the operations of method 700 may be performed by an image processing block as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 705, the device may generate a subspace based on a set of representative feature vectors for an object. The operations of 705 may be performed according to the methods described herein. In some examples, aspects of the operations of 705 may be performed by a subspace manager as described with reference to FIG. 5.

At 710, the device may obtain an array of pixels representing an image. The operations of 710 may be performed according to the methods described herein. In some examples, aspects of the operations of 710 may be performed by a pixel array controller as described with reference to FIG. 5.

At 715, the device may determine, by an image signal processor of the device, a probe feature vector for the image by applying a convolutional operation to the array of pixels. The operations of 715 may be performed according to the methods described herein. In some examples, aspects of the operations of 715 may be performed by a probe vector manager as described with reference to FIG. 5.

At 720, the device may create a reconstructed feature vector in the subspace based on the set of representative feature vectors and the probe feature vector. The operations of 720 may be performed according to the methods described herein. In some examples, aspects of the operations of 720 may be performed by a reconstructed vector controller as described with reference to FIG. 5.

At 725, the device may compare the reconstructed feature vector and the probe feature vector. The operations of 725 may be performed according to the methods described herein. In some examples, aspects of the operations of 725 may be performed by a vector comparator as described with reference to FIG. 5.

At 730, the device may recognize the object in the image based on the comparison. The operations of 730 may be performed according to the methods described herein. In some examples, aspects of the operations of 730 may be performed by an object recognizer as described with reference to FIG. 5.

Figure 8:
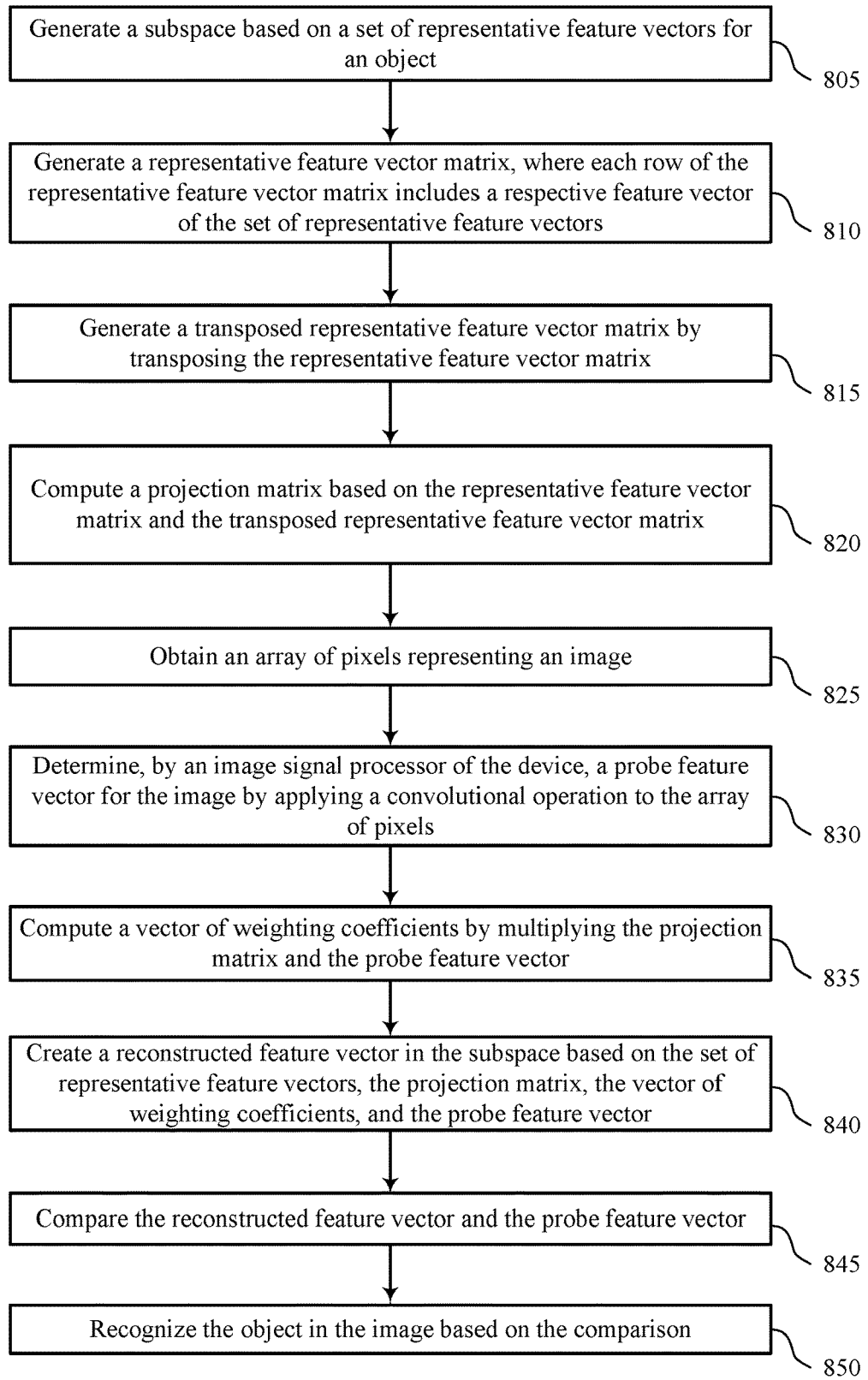

FIG. 8 shows a flowchart illustrating a method 800 that supports feature matching with a subspace spanned by multiple representative feature vectors in accordance with aspects of the present disclosure. The operations of method 800 may be implemented by a device or its components as described herein. For example, the operations of method 800 may be performed by an image processing block as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 805, the device may generate a subspace based on a set of representative feature vectors for an object. The operations of 805 may be performed according to the methods described herein. In some examples, aspects of the operations of 805 may be performed by a subspace manager as described with reference to FIG. 5.

At 810, the device may generate a representative feature vector matrix, where each row of the representative feature vector matrix includes a respective feature vector of the set of representative feature vectors. The operations of 810 may be performed according to the methods described herein. In some examples, aspects of the operations of 810 may be performed by a vector matrix manager as described with reference to FIG. 5.

At 815, the device may generate a transposed representative feature vector matrix by transposing the representative feature vector matrix. The operations of 815 may be performed according to the methods described herein. In some examples, aspects of the operations of 815 may be performed by a vector matrix manager as described with reference to FIG. 5.

At 820, the device may compute a projection matrix based on the representative feature vector matrix and the transposed representative feature vector matrix. The operations of 820 may be performed according to the methods described herein. In some examples, aspects of the operations of 820 may be performed by a vector matrix manager as described with reference to FIG. 5.

At 825, the device may obtain an array of pixels representing an image. The operations of 825 may be performed according to the methods described herein. In some examples, aspects of the operations of 825 may be performed by a pixel array controller as described with reference to FIG. 5.

At 830, the device may determine, by an image signal processor of the device, a probe feature vector for the image by applying a convolutional operation to the array of pixels. The operations of 830 may be performed according to the methods described herein. In some examples, aspects of the operations of 830 may be performed by a probe vector manager as described with reference to FIG. 5.

At 835, the device may compute a vector of weighting coefficients by multiplying the projection matrix and the probe feature vector. The operations of 835 may be performed according to the methods described herein. In some examples, aspects of the operations of 835 may be performed by a coefficient manager as described with reference to FIG. 5.

At 840, the device may create a reconstructed feature vector in the subspace based on the set of representative feature vectors, the projection matrix, the vector of weighting coefficients, and the probe feature vector (e.g., or a subset thereof). The operations of 840 may be performed according to the methods described herein. In some examples, aspects of the operations of 840 may be performed by a reconstructed vector controller as described with reference to FIG. 5.

At 845, the device may compare the reconstructed feature vector and the probe feature vector. The operations of 845 may be performed according to the methods described herein. In some examples, aspects of the operations of 845 may be performed by a vector comparator as described with reference to FIG. 5.

At 850, the device may recognize the object in the image based on the comparison. The operations of 850 may be performed according to the methods described herein. In some examples, aspects of the operations of 850 may be performed by an object recognizer as described with reference to FIG. 5.

Figure 9:
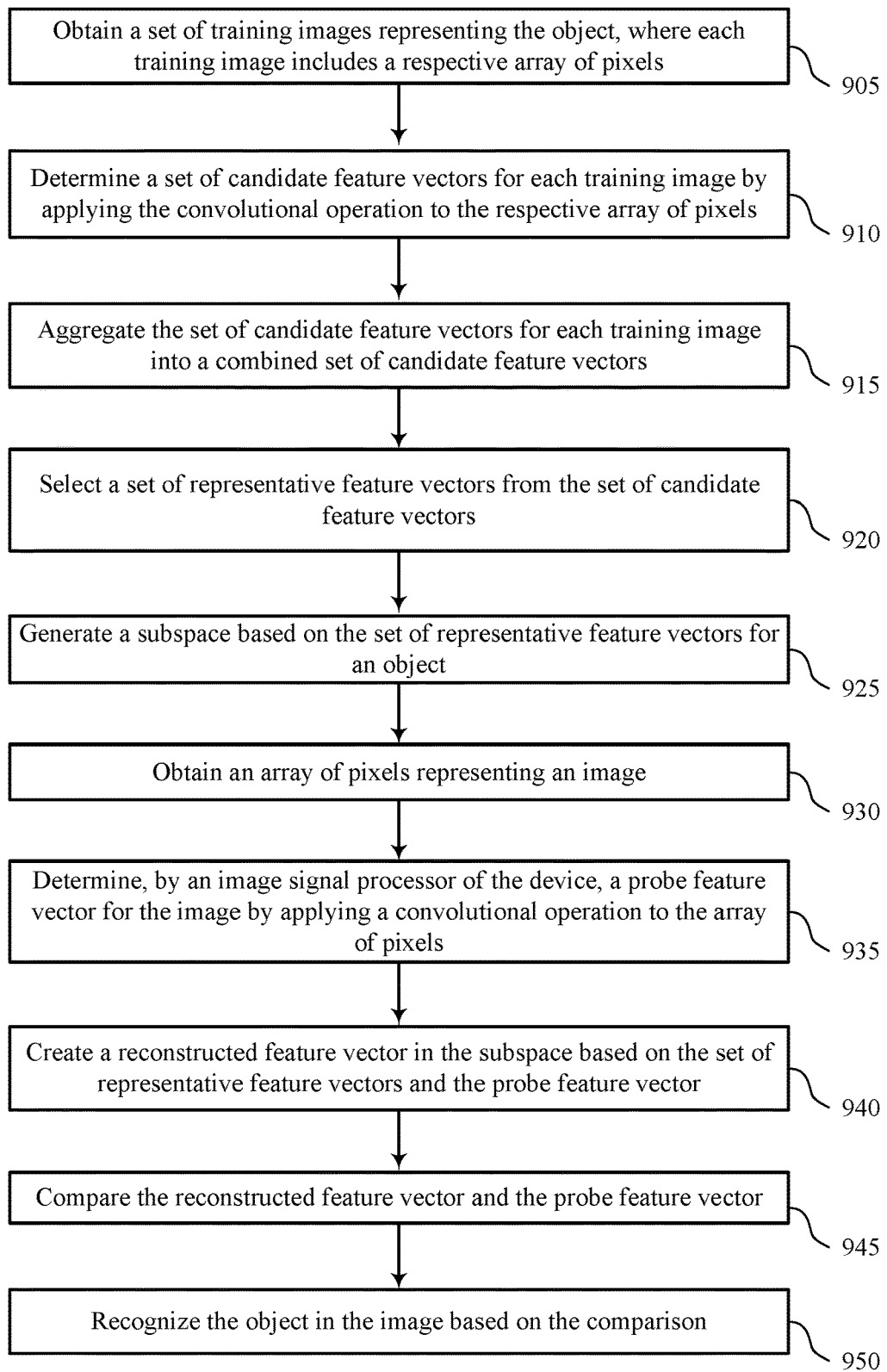

FIG. 9 shows a flowchart illustrating a method 900 that supports feature matching with a subspace spanned by multiple representative feature vectors in accordance with aspects of the present disclosure. The operations of method 900 may be implemented by a device or its components as described herein. For example, the operations of method 900 may be performed by an image processing block as described with reference to FIGS. 5 and 6. In some examples, a device may execute a set of instructions to control the functional elements of the device to perform the functions described below. Additionally or alternatively, a device may perform aspects of the functions described below using special-purpose hardware.

At 905, the device may obtain a set of training images representing the object, where each training image includes a respective array of pixels. The operations of 905 may be performed according to the methods described herein. In some examples, aspects of the operations of 905 may be performed by a training manager as described with reference to FIG. 5.

At 910, the device may determine a set of candidate feature vectors for each training image by applying the convolutional operation to the respective array of pixels. The operations of 910 may be performed according to the methods described herein. In some examples, aspects of the operations of 910 may be performed by a candidate vector manager as described with reference to FIG. 5.

At 915, the device may aggregate the set of candidate feature vectors for each training image into a combined set of candidate feature vectors. The operations of 915 may be performed according to the methods described herein. In some examples, aspects of the operations of 915 may be performed by a candidate vector manager as described with reference to FIG. 5.

At 920, the device may select a set of representative feature vectors from the set of candidate feature vectors. The operations of 920 may be performed according to the methods described herein. In some aspects of the operations of 920 may be performed by a subspace manager as described with reference to FIG. 5.

At 925, the device may generate a subspace based on the set of representative feature vectors for an object. The operations of 925 may be performed according to the methods described herein. In some examples, aspects of the operations of 925 may be performed by a subspace manager as described with reference to FIG. 5.

At 930, the device may obtain an array of pixels representing an image. The operations of 930 may be performed according to the methods described herein. In some examples, aspects of the operations of 930 may be performed by a pixel array controller as described with reference to FIG. 5.

At 935, the device may determine, by an image signal processor of the device, a probe feature vector for the image by applying a convolutional operation to the array of pixels. The operations of 935 may be performed according to the methods described herein. In some examples, aspects of the operations of 935 may be performed by a probe vector manager as described with reference to FIG. 5.

At 940, the device may create a reconstructed feature vector in the subspace based on the set of representative feature vectors and the probe feature vector. The operations of 940 may be performed according to the methods described herein. In some examples, aspects of the operations of 940 may be performed by a reconstructed vector controller as described with reference to FIG. 5.

At 945, the device may compare the reconstructed feature vector and the probe feature vector. The operations of 945 may be performed according to the methods described herein. In some examples, aspects of the operations of 945 may be performed by a vector comparator as described with reference to FIG. 5.

At 950, the device may recognize the object in the image based on the comparison. The operations of 950 may be performed according to the methods described herein. In some examples, aspects of the operations of 950 may be performed by an object recognizer as described with reference to FIG. 5.

It should be noted that the methods described above describe possible implementations, and that the operations and the steps may be rearranged or otherwise modified and that other implementations are possible. Further, aspects from two or more of the methods may be combined. In some cases, one or more operations described above (e.g., with reference to FIGS. 7 through 9) may be omitted or adjusted without deviating from the scope of the present disclosure. Thus the methods described above are included for the sake of illustration and explanation and are not limiting of scope.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, EEPROM, flash memory, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for object recognition comprising:
a processor,
memory in electronic communication with the processor; and
instructions stored in the memory and executable by the processor to cause the apparatus to:
generate a subspace based at least in part on a set of representative feature vectors for an object;
obtain an array of pixels representing an image;
determine, by an image signal processor of the apparatus, a probe feature vector for the image by applying a convolutional operation to the array of pixels;
create a reconstructed feature vector in the subspace based at least in part on the set of representative feature vectors and the probe feature vector;
compare the reconstructed feature vector and the probe feature vector; and
recognize the object in the image based at least in part on the comparison.

2. The apparatus of claim 1, wherein the instructions to create the reconstructed feature vector are executable by the processor to cause the apparatus to:
determine a vector of weighting coefficients for the set of representative feature vectors based at least in part on the probe feature vector; and
create the reconstructed feature vector based at least in part on a linear combination of the set of representative feature vectors, wherein the linear combination is based at least in part on the vector of weighting coefficients.

3. The apparatus of claim 1, wherein the instructions are further executable by the processor to cause the apparatus to:
generate a representative feature vector matrix, wherein each row of the representative feature vector matrix comprises a respective feature vector of the set of representative feature vectors;
generate a transposed representative feature vector matrix by transposing the representative feature vector matrix; and
compute a projection matrix based on the representative feature vector matrix and the transposed representative feature vector matrix, wherein the reconstructed feature vector is created based at least in part on the projection matrix.

4. The apparatus of claim 3, wherein the instructions are further executable by the processor to cause the apparatus to:
compute a vector of weighting coefficients by multiplying the projection matrix and the probe feature vector, wherein the reconstructed feature vector is created based at least in part on the vector of weighting coefficients.

5. The apparatus of claim 4, wherein the instructions to create the reconstructed feature vector are executable by the processor to cause the apparatus to:
    multiply the representative feature vector matrix by the vector of coefficients.

6. The apparatus of claim 1, wherein the instructions to generate the subspace are executable by the processor to cause the apparatus to:
    obtain a set of training images representing the object, wherein each training image comprises a respective array of pixels;
    determine a set of candidate feature vectors for each training image by applying the convolutional operation to the respective array of pixels;
    aggregate the set of candidate feature vectors for each training image into a combined set of candidate feature vectors; and
    select the set of representative feature vectors from the set of candidate feature vectors, wherein the subspace is generated based at least in part on the set of representative feature vectors.

7. The apparatus of claim 6, wherein the instructions to select the set of representative feature vectors from the set of candidate feature vectors are executable by the processor to cause the apparatus to:
    compute an average feature vector for the set of candidate feature vectors; and
    compare each candidate feature vector to the average feature vector, wherein the set of representative feature vectors is selected based at least in part on the comparisons.

8. The apparatus of claim 6, wherein the instructions to select the set of representative feature vectors from the set of candidate feature vectors are executable by the processor to cause the apparatus to:
    compute a first average feature vector for the set of candidate feature vectors;
    select a first representative feature vector from the set of candidate feature vectors based at least in part on the first average feature vector;
    generate a second set of candidate feature vectors by applying the first representative feature vector to each candidate feature vector;
    compute a second average feature vector for the second set of candidate feature vectors; and
    select a second representative feature vector from the second set of candidate feature vectors based at least in part on the second average feature vector.

9. A method for object recognition at a device comprising:
    generating a subspace based at least in part on a set of representative feature vectors for an object;
    obtaining an array of pixels representing an image;
    determining, by an image signal processor of the device, a probe feature vector for the image by applying a convolutional operation to the array of pixels;
    creating a reconstructed feature vector in the subspace based at least in part on the set of representative feature vectors and the probe feature vector;
    comparing the reconstructed feature vector and the probe feature vector; and
    recognizing the object in the image based at least in part on the comparison.

10. The method of claim 9, wherein creating the reconstructed feature vector comprises:
    determining a vector of weighting coefficients for the set of representative feature vectors based at least in part on the probe feature vector; and
    creating the reconstructed feature vector based at least in part on a linear combination of the set of representative feature vectors, wherein the linear combination is based at least in part on the vector of weighting coefficients.

11. The method of claim 9, further comprising:
    generating a representative feature vector matrix, wherein each row of the representative feature vector matrix comprises a respective feature vector of the set of representative feature vectors;
    generating a transposed representative feature vector matrix by transposing the representative feature vector matrix; and
    computing a projection matrix based on the representative feature vector matrix and the transposed representative feature vector matrix, wherein the reconstructed feature vector is created based at least in part on the projection matrix.

12. The method of claim 11, further comprising:
    computing a vector of weighting coefficients by multiplying the projection matrix and the probe feature vector, wherein the reconstructed feature vector is created based at least in part on the vector of weighting coefficients.

13. The method of claim 12, wherein creating the reconstructed feature vector comprises:
    multiplying the representative feature vector matrix by the vector of coefficients.

14. The method of claim 11, wherein the projection matrix is computed prior to obtaining the array of pixels representing the image.

15. The method of claim 9, wherein generating the subspace comprises:
    obtaining a set of training images representing the object, wherein each training image comprises a respective array of pixels;
    determining a set of candidate feature vectors for each training image by applying the convolutional operation to the respective array of pixels;
    aggregating the set of candidate feature vectors for each training image into a combined set of candidate feature vectors; and
    selecting the set of representative feature vectors from the set of candidate feature vectors, wherein the subspace is generated based at least in part on the set of representative feature vectors.

16. The method of claim 15, wherein selecting the set of representative feature vectors from the set of candidate feature vectors comprises:
    computing an average feature vector for the set of candidate feature vectors; and
    comparing each candidate feature vector to the average feature vector, wherein the set of representative feature vectors is selected based at least in part on the comparisons.

17. The method of claim 15, wherein selecting the set of representative feature vectors from the set of candidate feature vectors comprises:
    computing a first average feature vector for the set of candidate feature vectors;
    selecting a first representative feature vector from the set of candidate feature vectors based at least in part on the first average feature vector;
    generating a second set of candidate feature vectors by applying the first representative feature vector to each candidate feature vector;
    computing a second average feature vector for the second set of candidate feature vectors; and selecting a second representative feature vector from the second set of candidate feature vectors based at least in part on the second average feature vector.

18. The method of claim 15, wherein the object comprises a face and each training image comprises a respective representation of the face.

19. The method of claim 9, wherein the convolutional operation comprises a convolutional neural network (CNN), the CNN comprising one or more convolution layers, one or more normalization layers, one or more maximum feature mapping layers, one or more pooling layers, or a combination thereof.

20. A non-transitory computer-readable medium storing code for object recognition at a device comprising, the code comprising instructions executable by a processor to:
generate a subspace based at least in part on a set of representative feature vectors for an object;
obtain an array of pixels representing an image;
determine, by an image signal processor of the device, a probe feature vector for the image by applying a convolutional operation to the array of pixels;
create a reconstructed feature vector in the subspace based at least in part on the set of representative feature vectors and the probe feature vector;
compare the reconstructed feature vector and the probe feature vector; and
recognize the object in the image based at least in part on the comparison.

* * * * *